United States Patent [19]
Kuznetsov

[11] 3,728,028
[45] Apr. 17, 1973

[54] METHOD OF DISPERSION ANALYSIS OF SUSPENSIONS AND DEVICE FOR EFFECTING THE SAME

[76] Inventor: Jury Nikolaevich Kuznetsov, prospekt Levina 55 kv. 45, Yaroslavl, U.S.S.R.

[22] Filed: Oct. 30, 1970
[21] Appl. No.: 85,483

[52] U.S. Cl. ..............................356/38, 250/219 TH
[51] Int. Cl. ..........................G01n 1/00, G01n 33/28
[58] Field of Search..........................356/38, 210, 72; 250/218, 219 TH, 201

[56] References Cited

UNITED STATES PATENTS

| | | | |
|---|---|---|---|
| 3,232,711 | 1/1966 | Senyk et al. | 356/38 X |
| 3,589,813 | 6/1971 | Sturzinger | 250/218 X |

*Primary Examiner*—James W. Lawrence
*Assistant Examiner*—T. N. Grigsby
*Attorney*—Holman & Stern

[57] ABSTRACT

A method of dispersion analysis of a suspension, in which the suspension is distributed on a carrier by means of a scraper, the carrier being continuously moved in one direction relative to the scraper, the dispersion of the suspension is estimated in the method of the invention by the maximum layer of suspension at which a prescribed amount of particles per unit of the layer area project above the layer surface. A device for effecting the above-mentioned method, employs a carrier onto which the suspension is fed the carrier is provided with a drive for rotation of the carrier.

7 Claims, 4 Drawing Figures

METHOD OF DISPERSION ANALYSIS OF SUSPENSIONS AND DEVICE FOR EFFECTING THE SAME

BACKGROUND OF THE INVENTION

DESCRIPTION OF PRIOR ART

The present invention relates to methods of controlling chemical and physical processes and to equipment for effecting the same. More particularly, the invention relates to methods of dispersion analysis of suspensions and to devices for carrying this method into effect. The proposed method of dispersion analysis can be used in the process of grinding and dispersing high-concentration suspensions containing more than 10 percent of solid-phase components, particularly, when dispersing dyeing suspensions.

Known in the art is a method of dispersion analysis of suspensions, in which the suspension is disposed as a layer on a sheet carried by means of a scraper, the extent of dispersion of the suspension being evaluated by the maximum thickness of the suspension layer at which a predetermined amount of particles per unit of the layer area project above the layer surface.

Also known in the art is a device for effecting the above mentioned method of dispersion analysis comprising a carrier on which the suspension to be evaluated is applied, and a scraper used for distribution of the suspension over the carrier. The latter has a wedge-shaped groove provided with a scale used for calculating the depth of the suspension layer. By using the above-said scraper, the suspension layer is distributed along the wedge-shaped groove and the maximum thickness of the suspension layer is determined by the extent to which a prescribed amount of particles per unit of the layer area project above the layer surface.

However, the known method of dispersion analysis of suspensions is disadvantageous in that it is conducted manually, is not adequately objective and is not suitable for an automatic production line whose operation is based on processes of grinding and dispersing. Therefore, the known devices for carrying the proposed method into effect do not enable the extent of dispersion of the suspension to be determined with sufficient accuracy nor do they make it possible to carry out a continuous analysis of the suspensions.

SUMMARY OF THE INVENTION

The basic object of the invention is to provide such a method of dispersion analysis of suspensions and a device for effecting this method, which makes it possible to accurately measure the dispersion of suspensions and to provide for an objectivity of the measurements, while ensuring the possibility of conducting a continuous automatic analysis of the suspensions.

This object is attained by providing a method of dispersion analysis of suspensions, in which the extent of dispersion of the suspensions is evaluated by the maximum thickness of the suspension layer distributed over a carrier with the aid of a scraper so that a certain portion of particles per unit of the layer area projects above the surface of the layer, thus determining the roughness of the layer; according to the invention, the suspension is continuously fed onto the carrier while being moved in one direction relative to the scraper.

The thickness of the suspension layer distributed over the carrier is preferably controlled by changing the gap between the scraper and the carrier.

The gap between the scraper and the carrier may be kept constant, while the change in the extent of dispersion is evaluated by the roughness of the suspension layer.

The roughness of the suspension layer may be kept constant by changing the gap between the scraper and the carrier, while the extent of dispersion of the suspension is determined by measuring the value of this gap.

The gap between the scraper and the carrier may be changed by a cyclic law within a prescribed range, while the composition of the dispersion is determined by estimating the roughness of the suspension layer corresponding to each value of the gap.

The roughness of the suspension layer is preferably determined by a photometric method.

The device for effecting the proposed method of dispersion analysis comprises a carrier for applying thereon the suspension under study and a first scraper for distributing the suspension over the carrier as a layer of a predetermined section; according to the invention, the carrier is made in the form of a disk equipped with a drive for its rotation.

The disk is preferably provided with a central aperture for removing the suspension.

The device is preferably provided with an additional scraper adjacent to the working surface of the disk and used for cleaning this surface from the suspension.

The device is preferably provided with a means for changing the gap between said first scraper and the carrier, which means may be composed of a drive forcing the disk to reciprocate in an axial direction.

The device is preferably provided with means for illumination of the suspension layer and an instrument for measuring the light flux reflected from the suspension layer said instrument being connected at an input thereof to a photorecliner.

The device may be provided with a source of illumination of the suspension layer and with a light receiver connected to the input of a measuring unit, the signal from output of this measuring unit being fed to the means for changing the gap between the first scraper and the carrier.

BRIEF DESCRIPTION OF THE DRAWING

Other objects and advantages of the invention will be appatent from the following description of one particular embodiment thereof, reference being made to the accompanying drawing, in which.

DESCRIPTION OF PREFERRED EMBODIMENT

Figure 1:
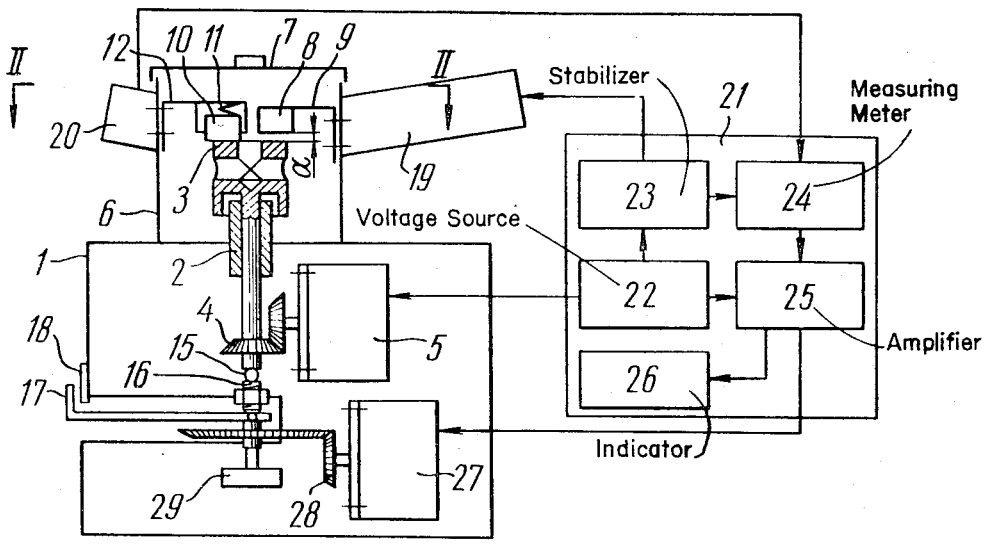
FIG. 1 shows a longitudinal section of the device for effecting the method of dispersion analysis of suspensions according to the invention.

The device for dispersion analysis of suspensions has a housing 1 (FIG. 1), in which there is rigidly secured a bronze sliding bearing 2. Mounted in the bearing 2 is a carrier 3 which can be rotated through a bevel gearing 4 with the help of a synchronous electric motor 5. The carrier 3 consists of a disk with a central aperture for passing the suspension. A cup 6 rigidly connected with the housing 1 limits the space wherein the suspension is to be tested. The cup 6 has a cover 7. Secured to the cup 6 is a flat laminar scraper 8, for example made of corundum, which is used for leveling the suspension on the carrier 3. The scraper 8 is secured by means of a holder 9.

Cleaning of the carrier from the tested suspension is effected by an additional scraper - cleaner 10 made in the form of a lamination of a high-strength material and fitted to the carrier 3 by means of a spring 11. The cleaner 10 is mounted on the cup 6 through a holder 12. The suspension is fed onto the carrier through a pipe 13 (FIG. 2), passing through the side wall of the cup 6, and is removed therefrom through a pipe 14 secured on the housing 1.

The change of the gap $a$ (FIG. 1) between the scraper 8 and the carrier 3 is effected due the reciprocation of the carrier 3 in a vertical direction through a ball bearing 15 by rotating a micrometer screw 16. Rotation of the latter is effected with the help of a handle 17 whose position is checked with the aid of a dial 18 secured on the housing 1 and indicating the value of the gap $a$. The device is also provided with a means to produce a collimated light beam and a photoreceiver 19 detecting the light flux reflected from the suspension layer.

For the purpose of a better stabilization of the readings, for elimination of the effect of the solid and liquid phases of the suspension, for reduction of the effect of voltage fluctuations in the supply mains as well as of the instability of the characteristics of the photocell, the device is preferably provided with two photoreceivers 20, one being installed on the path of a portion of the mirror-reflected light flux and the other being placed on the path of light flux dispersed by the particles of the suspension. The photoreceivers 20 are connected either into a balanced electric bridge circuit or into a differential electric circuit.

In order to obviate the disadvantages of prior art apparatus the device is preferably provided with a modulator (not shown) of light fluxes mirror-reflected from the suspension layer and dispersed by the particles protruding from the suspension, said light fluxes being alternately applied on one of the light receivers 20 due to the modulation.

The light receiver 20 is connected with the input of a secondary instrument 21 which comprises a voltage source 22, a stabilizer 23, a light flux meter 24, an amplifier 25 and a null indicator 26. During the automatic operation of the device, a measuring unit (not shown) is used which develops an output signal fed to an electric motor 27 which through a gear transmission 28 is coupled with the micrometer screw 16 and handle 17 provide a change of the gap $a$.

For remote indication of the value of the gap $a$, the device is provided with a detector 29 by means of which the value of the gap $a$ is converted into a standard signal.

The device for dispersion analysis of suspensions operates as follows.

The suspension is continuously supplied through the pipe 13 (FIG. 2) onto the carrier 3 which is rotated at a constant speed by the electric motor 5 (FIG. 1) through the drive 4. By means of the scraper 8 the suspension is evened on the carrier 3 into a layer having a rectangular cross section. The suspension layer is continuously illuminated by the illuminant 19.

Figure 2:
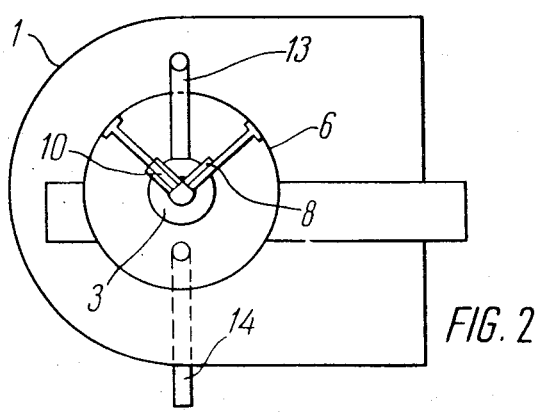
FIG. 2 is a sectional view taken along the line II—II in FIG. 1.

The roughness of the layer, i.e. the number and height of the particles or aggregates of suspensions protruding above the layer per unit of layer area is estimated visually through the opening (slot) in the cup 6. For obviating the escape of any vapors in the suspension liquid from the cup 6, said opening is closed with a transparent material. The handle 17 is turned by hand, thus changing the gap $a$ to such a position, at which the roughness attains a predetermined value (of the order of 20 particles per 1 $cm^2$). The value of the gap $a$ in microns indicated on the dial 18 is representative of the degree of dispersion of the suspension. The suspension is continuously removed from the carrier 3 by the cleaner 10 and flows down both at the sides of the carrier 3 and in the center thereof, and led out through the outlet pipe 14 (FIG. 2).

Figure 3:
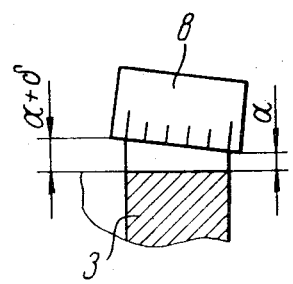
FIG. 3 shows a version of mounting of the scraper relative to the carrier in the device for dispersion analysis of suspensions according to the invention.
Figure 4:
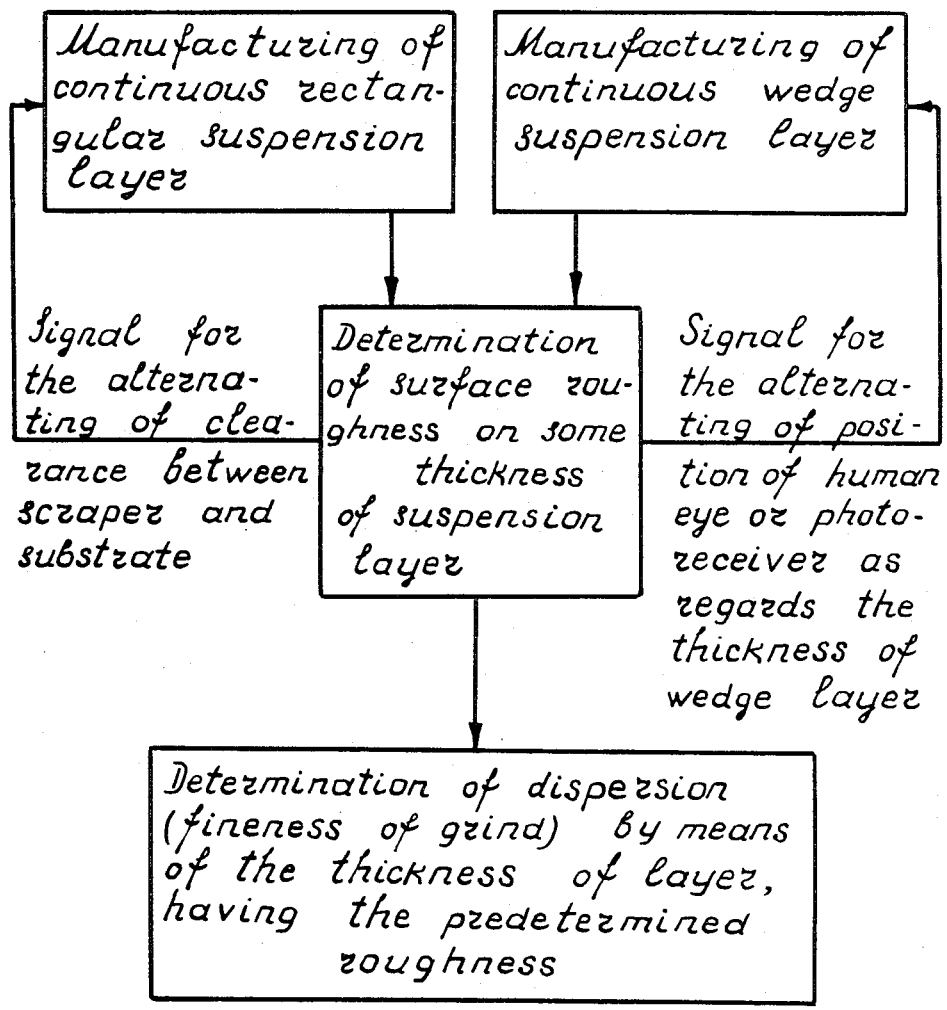
FIG. 4 shows a flow-sheet of the process-steps involved in the method of the invention.

When the handle 17 (FIG. 1) and the screw 16 are not rotated, the roughness is observed in a layer having a wedge-shaped section. For this purpose the scraper 8 is set at an angle to the carrier 3, as shown in FIG. 3, while making marks on the scraper 8 or on an additional rule to indicate the distances between the points of the scraper 8 and the carrier 3.

The roughness of the suspension layer may be estimated by the photometric method. In this case the illuminant 19 (FIG. 1) is installed at the angle of incidence of the light flux equal to 60°–90° to the surface of the layer 3. The light flux reflected from the suspension layer is detected by the photoreceiver 20 which is installed relative to the carrier 3 either at an angle equal to the angle of incidence of the light from the smooth surface of the suspension layer (light field method) or at an angle higher or lower than the above angle of incidence (dark field method). From the photoreceiver 20 the signal, the magnitude of which corresponds to the roughness of the suspension layer, is fed to the meter 24 and is indicated by the null indicator 26. By feeding the suspension of unknown dispersion onto the carrier 3 and by moving the handle 17 by hand, the latter is stopped in such a position in which the magnitude of the photoelectric current corresponds to the prescribed roughness, in which case the null indicator 26 is set to zero. The value of the gap $a$ shown on the dial 18 by the handle 17 determines the degree of dispersion of the suspension.

In order to provide a fully atomatic control of the device of the present invention, the arrangement is provided with feedback elements: an amplifier 25 in the secondary instrument 21, a reversible electric motor 27 and a gear transmission 28 which allow the handle 17 to be moved automatically depending on the roughness of the layer. In this case the signal from the measuring unit of the secondary instrument 21 is fed into the amplifier 25 which controls the reversible electric motor 27. All elements of the secondary instrument 21 can be procured in mass production are in mass industrial production and may be subjected to minor modifications which are not described herein. When it is necessary to provide for facilities of remote transmission of the indications during the automatic measurements of dispersion, the element 24 is used which converts the value of the angle of rotation of the handle 17, i.e. the gap $a$, into a standard signal.

In addition, when no feed-back is used, it is possible to record an unbalance signal on the self-recording null indicator 26, so as to record a signal representative of the deviation of the layer roughness from the prescribed value at a definite gap $a$. This method is used on employing the proposed device for maintaining the prescribed dispersion of the product in a system for automatic control of the process of production.

When using the device for recording curves illustrating the distribution of the suspension particles by size, the gap $a$ between the scraper 8 and the carrier 3 must be changed in the process of analysis of the suspension by a cyclic law within a predetermined range. The gap can be changed both manually by moving the handle 17, and automatically through the electric motor 27. In the latter case the secondary instrument 21 is provided with an additional circuit for controlling the electric motor 27 so as to change the gap $a$ in prescribed manner with the help of the motor 27. The roughness of the layer corresponding to each value of the gap is recorded on a self-recording instrument which is a part of the secondary instrument 21. For example, the above nullindicator 26 may be used for this purpose. During such an operation of the device the self-recording instrument records curves following one another and illustrating the distribution of the suspension particles by size.

The means for automatically changing the gap $a$ in the required manner can be accomplished in various forms of arrangements. For example, the movement of the carrier 3 up and down can be effected by mounting a program disk with a variable radius (not shown in the drawing) on the shaft of the electric motor 27. During the rotation of the disk, reciprocating motion is imparted to the carrier 3 through the ball support 15, with the result that the gap $a$ is changed. In this case the electric motor 27 is fed from the voltage source 22 of the secondary instrument 21 so that a control circuit for the electric motor is unnecessary.

The approximate time of recording one curve does not exceed 1–5 minutes depending on the speed of movement of the tape of the self recording instrument, the rate of change of the gap $a$ and the rotational speed of the carrier 3.

Prior to the operation, the device is adjusted so that the glossy surface of the suspension layer always corresponds to one value on the dial of the indicating instrument, while the prescribed roughness corresponds to the other known value of the dial.

The proposed method of dispersion analysis of suspensions and the device for carrying this method into effect make it possible to accurately and objectively estimate the degree of dispersion of the suspensions and to carry out an automatic and continuous analysis of the suspension. The minimum size of the particles estimated by this device is substantially the same as attained by using the known devices forming a wedge-shaped layer of the suspension, i.e. within 5 to 10 microns.

Furthermore, the device makes it possible to quickly obtain information about the distribution of particles which is necessary in scientific investigations for estimating the operations of various dispersing equipment and the properties of the suspensions being measured; these operations are impracticable to be made using the known devices without changing the composition of the suspension to be investigated.

I claim:

1. A method of dispersion analysis of a suspension, comprising: feeding the suspension on to a movable carrier; forming a suspension layer of a predetermined cross section on the carrier surface by a scraper disposed above said moving carrier in spaced relation thereto; continuously moving the carrier in a predetermined direction with respect to the scraper to form a layer of suspension having a wedge-shaped cross section; determining a maximum thickness of the suspension layer projecting above a general surface of said layer in terms of an amount of particles per unit area of said layer projecting above said general surface of said layer; and using the thickness so determined to assess the roughness of the layer thereby to measure the extent of dispersion in the suspension.

2. A method as claimed in claim 1, in which the step of forming a suspension-layer of a predetermined cross section comprises forming a suspension-layer of rectangular cross section, and wherein, the method includes changing the value of a gap between said scraper and said carrier, whereby, the degree of dispersion of the suspension is determined by the maximum thickness of the layer that can be formed with a predetermined roughness.

3. A method as claimed in claim 1, wherein, the step of determining the maximum thickness of the suspension layer projecting above a general surface of said layer comprises estimating the layer roughness by a photometric method using light flux and setting a photoreceiver at an angle between 60° and 90° to a direction perpendicular to the surface of the carrier.

4. A device for dispersion analysis of a suspension, comprising: a carrier onto which the suspension to be investigated is fed, said carrier being made in the form of a disc having a centrally located aperture to remove the suspension after analysis; a drive means for rotating said carrier at a predetermined speed; a scraper means disposed in spaced relation above said disc to define a gap for distributing the suspension over said disc in the form of a layer of a prescribed cross section; and an additional scraper means disposed contacting the carrier surface for cleaning and removing the suspension after analysis from the carrier surface.

5. A device as claimed in claim 4 further including a means for changing the gap between the scraper and the carrier, said means comprising a micrometric screw fitted with a unit to cause rotation thereof and a consequent vertical axial movement, said vertical axial movement being transmitted to the rotating carrier in a vertical direction to change the gap between the scraper and the carrier.

6. A device as claimed in claim 5 which further comprises an illuminant for illuminating the suspension layer, and, a photoreceiver connected with an input of a measuring meter having an output signal, said output signal being fed back to said means for changing the gap between the scraper and the carrier.

7. A device as claimed in claim 4, wherein said additional scraper means is provided with a spring element so as to be biased into contact with the carrier surface.

* * * * *